(12) United States Patent
Lalancette

(10) Patent No.: US 6,642,445 B1
(45) Date of Patent: Nov. 4, 2003

(54) CABLE PROTECTOR PLATE

(75) Inventor: Daniel Lalancette, L'Acadie (CA)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/345,514

(22) Filed: Jan. 16, 2003

(51) Int. Cl.[7] .................................................. H02G 3/04
(52) U.S. Cl. .......................... 174/48; 174/58; 174/135; 33/528; 220/3.2; 220/3.9
(58) Field of Search .................... 174/48, 58, 135; 33/528; 220/3.2, 3.3, 3.9

(56) References Cited

U.S. PATENT DOCUMENTS

| | | | |
|---|---|---|---|
| 3,211,824 A | * 10/1965 | Heiman | 174/48 |
| 3,211,825 A | * 10/1965 | Clos | 174/48 |
| 3,240,869 A | 3/1966 | Jureit | 174/135 |
| 3,297,815 A | 1/1967 | Drettmann | 174/48 |
| 3,350,501 A | 10/1967 | Jureit | 174/135 |
| 3,515,797 A | * 6/1970 | Hochstetler | 174/135 |
| 3,553,346 A | 1/1971 | Ballantyne | 174/48 |
| 3,689,681 A | 9/1972 | Searer et al. | 174/48 |
| 4,050,205 A | 9/1977 | Ligda | 52/357 |
| D264,683 S | 6/1982 | Searer | D8/354 |
| 4,807,417 A | 2/1989 | Bell | 52/699 |
| 4,845,913 A | 7/1989 | Bell | 52/699 |
| 4,924,646 A | 5/1990 | Marquardt | 52/221 |
| 5,163,254 A | 11/1992 | Zastrow et al. | 52/27 |
| 5,359,151 A | 10/1994 | Nattel et al. | 174/48 |
| 5,595,453 A | 1/1997 | Nattel et al. | 403/252 |

* cited by examiner

Primary Examiner—Dhiru R Patel
(74) Attorney, Agent, or Firm—Michael L. Hoelter; G. Andrew Barger

(57) ABSTRACT

The present invention provides for a protector plate that can be readily secured to furring strips in a manner that reduces and/or eliminates any bowing or deflection of the furring strip during installation. This protector plate is to be located on the furring strip so that its face panel is positioned to protect any service component located there behind from nails, screws or other anchors that may be subsequently driven into the wall. The protector plate contains a front panel having a flange secured thereto with prongs, tabs, sawteeth or other securing assembly jutting or extending from this flange. This securing assembly is designed to penetrate the furring strip along its stronger axis.

19 Claims, 3 Drawing Sheets

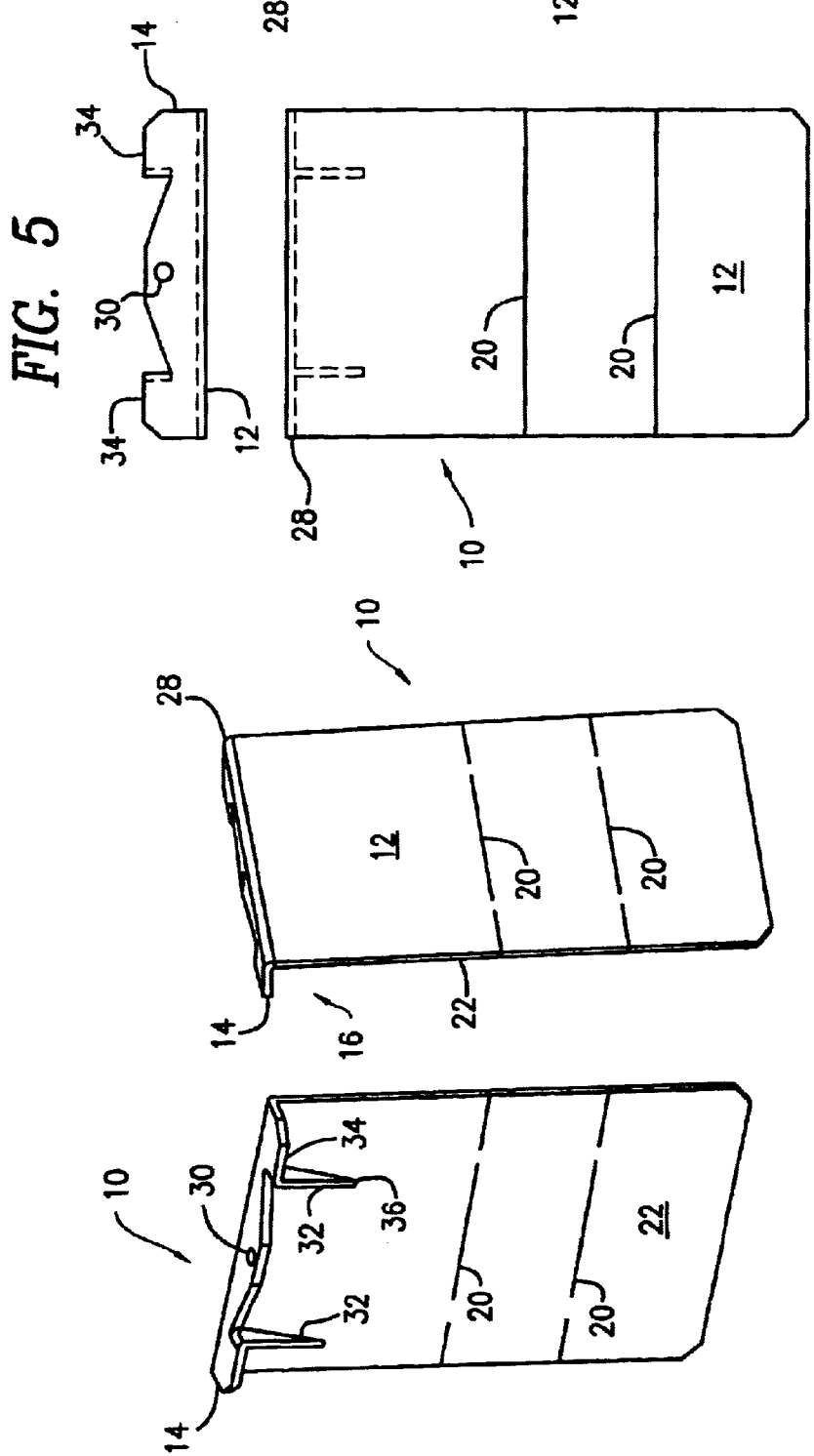

CABLE PROTECTOR PLATE

FIELD OF THE INVENTION

The present invention pertains to protector plates used to protect wires and other service components located within walls from accidental damage during construction or renovation.

BACKGROUND OF THE INVENTION

Protector plates are used quite extensively to protect devices hidden behind wall surfaces. A common utilization is shown and described in U.S. Pat. No. 4,807,417. In summary, electrical, plumbing and other services employ components that are routinely routed through, along or within the walls of a structure. Once the wall-board or other wall covering is installed, the location of these services is no longer apparent and thus it is possible that a nail, screw or other support or anchor driven into the wall covering my impinge upon one of these service components. In some cases, the damage done is immediate; in other situations, the damage incurred will only manifest itself over time. In any event, the repair of such service component will be costly. Hence it has become a common practice to use inexpensive protector plates during the construction of these walls at locations where such damage is likely to occur.

One very common design for such protector plates is a generally flat rectangular strip of metal having a thickness sufficient enough to resist nails, screws and the like. One example of this is shown in U.S. Pat. No. 3,240,869 to Jureit. This plate is configured with one or more prongs or tabs extending from this flat strip which are designed to be embedded into the support studs of the wall. This plate is secured to the front of the support stud to cover or protect the service component positioned therebehind. The wall board or covering is then installed over both the support stud and protector plate such that any subsequent drywall screw, nail or other fastener or anchor will not inadvertently nick, pierce or damage such service component. Because the prongs or tabs are generally punched out of the plate, there thus exist small openings in the plate through which a nail or screw might penetrate thereby compromising the protection desired.

The above flat planar protector plates are of the type that mount flush against the front surface of the support stud, other variations also exist that fit within notches cut into these support studs. Some of these other designs are 'J' shaped (see, for example, U.S. Pat. No. 3,297,815 and 3,350,501) while others are more 'boxy' in appearance (see, for example, U.S. Pat. No. 3,211,824 and 4,924,646).

In support studs, each of these designs probably perform satisfactorily, however in walls employing furring strips (the generally horizontal supports extending between support studs), these devices are not as suitable. This is because these furring strips are smaller in size and thus do not have the same strength or stiffness as the support studs. Also, smaller furring strips cannot readily accommodate notches cut therein while still maintaining their span strength. Furthermore, furring strips have less tolerance for devices driven into their front surface due to this being along their weaker axis. Driving into the front surface of these furring strips causes them to deflect or bow inwardly which often results in breakage. If the furring strip is not broken, then this deflection or bowing action may cause their attachment to the support stud to come loose or weaken. In either event, use of the above types of protector plates on furring strips is fraught with problems.

Additionally, the situation may arise where the depth of the furring strip and/or the location of the service component within the wall necessitates the protection of more surface area than one such typical protector plate can provide. In such situations, the use of two or more such plates will be needed. Alternatively, the selected protector plate may be too large for its intended purpose, thus necessitating that it be cut or trimmed in the field.

It is thus an object of this invention to provide a protector plate that can perform equally well on both furring strips and support studs. It is another object of this invention to provide a means of securing the protector plate in a manner that utilizes a stronger axis of the furring strip so as to reduce or eliminate any breakage, deflection or bowing. Another object of this invention is to provide a protector plate that does not require any notching or cutting of its support for use or installation. Yet another object of this invention is to provide a protector plate whose size can be adjusted in order to accommodate those situations where less protective cover is desired. It is also an object of this invention to provide a single protector plate that can protect the entire front of typical furring strips. Still another objection of this invention is to provide a protector plate design that is relatively inexpensive to manufacture and easy to use and install.

These and other objects and advantages of this invention will become obvious upon further review.

SUMMARY OF THE INVENTION

This invention pertains to a protector plate that is configured for use on furring strips as well as on support studs. It is designed to provide protection for the service component or components located therebehind from damage that may result when nails, screws, fasteners, anchors and the like are subsequently driven into the wall surface. This invention is also designed so that the manner of securement of the protector plate to the furring strip occurs in a direction of higher strength for the furring strip in order to reduce or eliminate any bowing or deflection of the furring strip that might otherwise occur.

In particular, this invention pertains to a protector plate having a front plate designed to abut the front surface of a furring strip or support member. A shorter flange extends from this front plate in a direction generally transverse to the front plate. This flange is designed to abut an adjacent side surface of the support member. One or more prongs project from this flange in a direction generally parallel to the front plate for penetration into the side surface of the support member.

BRIEF DESCRIPTION OF THE DRAWINGS

FIG. 1 is a back perspective view of the invention.

FIG. 2 is a front perspective view of the invention.

FIG. 3 is a front view of the invention.

FIG. 4 is a side elevation view of the invention.

FIG. 5 is a top plan view of the invention.

DETAILED DESCRIPTION OF THE PREFERRED EMBODIMENT

Figure 6:
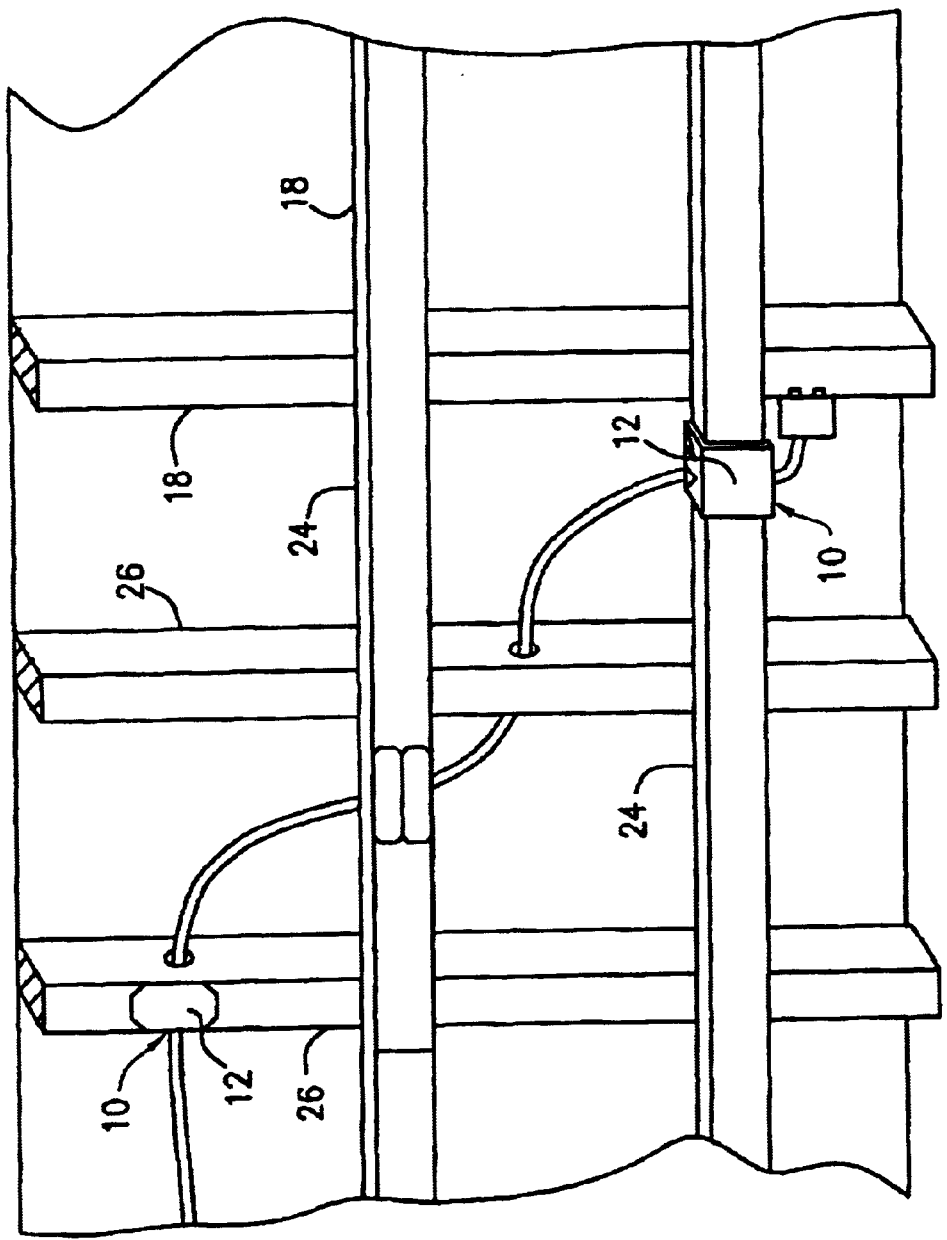
FIG. 6 is a perspective view of some of the applications of the invention.

Referring to the drawings, there is shown protector plate 10 having a generally rectangular front panel 12 with one or more flanges 14 extending therefrom. The space or area that is defined between front panel 12 and flange 14 is support member receiving area 16. It is within this area 16 that support member 18 (FIG. 6) is to be located. Obviously, protector plate 10 is driven into a side surface of support member 18 so that front panel 12 can be positioned to protect whatever service components may lay therebehind.

Protector plate 10 is made of a thin material yet this material should be strong enough to resist the penetration of nails, screws, fasteners, anchors and the like (not shown) therethrough. While it may still be possible to drill, drive or screw through protector plate 10, the effort required should be noticeably different from that normally required for the underlying material in order to alert the installer that service components are nearby. Hence, generally protector plate 10 is made of metal, but other materials may also be suitable for this purpose.

In the embodiment shown, front panel 12 is illustrated as being planar. However, it is anticipated that in other versions, there may be embossments, tabs or stand-offs projecting from front panel 12. Also, while the embodiment shown illustrates a plurality of score lines 20 cut into front panel 12, other embodiments may only involve a single score line 20 or they may encompass one or more knockouts or openings therein. In the illustrated version, score lines 20 aid the user in either bending front panel 12 as desired, or detaching sections thereof. Ideally, score lines 20 in front panel 12 would be positioned so that they corresponded or align with the edges or corners of the support upon which protector plate 10 is to be mounted.

Whatever the configuration of front panel 12 (i.e. whether or not it includes projections or cut-aways.), the back surface 22 (or portions thereof) of front panel 12 is designed to abut the front surface of its corresponding support member 18. In FIG. 6, support member 18 is shown as being either furring strip 24 or upright stud 26. When protector plate 10 is secured to furring strip 24, it is installed in a vertical direction; however, when secured to stud 26, protector plate is rotated 90 degrees and installed in a horizontal direction.

In the embodiment shown, front panel 12 has edge 28 from which one or more flanges 14 extend. Edge 28 is generally along one of the shorter perimeter edges of rectangular front panel 12 but there is no reason that edge 28 cannot extend along a longer edge of front panel 12 or extend from an intermediate portion of front panel 12. While flange 14 is shown as extending at a 90 degree angle (more or less) from front panel 12, other angles are equally possible depending on the use of protector plate 10 and the geometry of support member 18. Preferably, flange 14 is created by bending during manufacture, but flange 14 can also be separately attached or molded onto front panel 12. Also, flange 14 may or may not be of the same material or same thickness as front panel 12. Also, the extension of flange 14 away from edge 28 as compared to the length of front panel 12 as measured from edge 28 is small. In other words, the length of front panel 12 is considerably longer than the depth of flange 14. As such, protector plate 10 can be secured to support members 18 of small depth without flange 14 extending beyond the back surface of such support member 18.

Ideally, flange 14 will extend the length of edge 28, but in some embodiments, flange 14 will only extend along a portion of edge 28. Also, each such flange 14 may or may not incorporate a hole 30 therein which is sized to accept a nail or screw therethrough. To prevent breakage of support member 18 when using hole 30, its location should be spaced from edge 28 as much as reasonably possible.

Flange 14 is configured with a pair of depending prongs 32. In some embodiments, only one prong 32 is needed for protector plate 10 while in other embodiments, more than two such prongs 32 are utilized. Furthermore, prongs 32 may actually be configured as a series of saw teeth positioned along flange 14 or there may be sawteeth along the prong itself (see FIG. 7). In all these figures, prongs 32 are shown as entering the top surface of furring strip 24 opposite the grain of wood but prong or prongs 32 can also be configured to enter the wood parallel to the grain if desired (or any angle in-between). In the embodiments shown, prongs 32 are depicted as being cut or bent from portions of flange 14. While this may be the simplest method of manufacture, prongs 32 can also be made of different material, of a different thickness or secured to flange 14 by other means. Prongs 32 are depicted as extending downward from flange 14 in a direction parallel to front panel 12 but other directions are also equally possible. Prongs 32 are preferably spaced from back surface 22 of front panel 12 and in the embodiments shown, prongs 32 extend downward from back end region 34 of flange 14. The protruding or extending end 36 of prong 32 is preferably beveled, sharpened or pointed so as to make its penetration into support member 18 easier. As seen more clearly in FIG. 4, prongs 32 are also tapered to a point. Ideally, this taper would help push or abut back surface 22 of front panel 12 against its corresponding support member 18.

Based on the above configuration of protector plate 10, during installation, a user would abut back surface 22 against the front surface of support member 18. Pointed end 36 of prongs 32 would also be poised for insertion into the side surface of support member 18. Once positioned, prongs 32 would be hammered or otherwise driven into this side surface till stopped by either flange 14 or until protector plate was determined to be sufficiently secured to support member 18. Of course, protector plate 10 would only be installed where there are service components (i.e. electrical or communication wiring, plumbing, etc.) within support member 18 that may need protection from the subsequent insertion of drywall screws or other fasteners or anchors. The thinness of protector plate 10 prevents any bulge from occurring underneath any subsequently installed drywall, yet protector plate 10 is thick enough to provide protection to the now hidden service components.

With special respect to furring strips 24 when oriented as shown in FIG. 6, the direction along which prongs 32 of protector plate 10 are driven is along a stronger axis of furring strip 24 (i.e. the vertical axis) and not along its weaker axis (i.e. into or perpendicular to the front face of furring strip 24). This is because prongs 32 are driven into the smaller side surface of furring strip and not into its larger front surface. Hence, the action of driving protector plate 10 into furring strip 24 eliminates or reduces any bowing or flexing of furring strip 24 between studs 26 which in turn reduces the likelihood of any inadvertent breakage. Furthermore, this direction of force applied to furring strip 24 reduces and/or eliminates any loosening, weakening or withdrawal of the nail or screw anchors (not shown) that secures furring strip 24 to adjacent studs 26 which would not be the case if the direction of force applied to furring strip 24 were into its front face.

Figure 7:
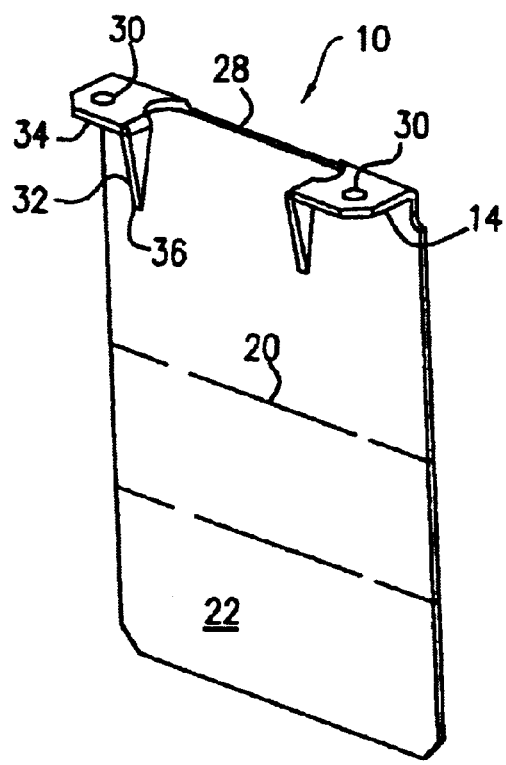
FIG. 7 is a back perspective view of an alternate embodiment of the invention.
Figure 8:
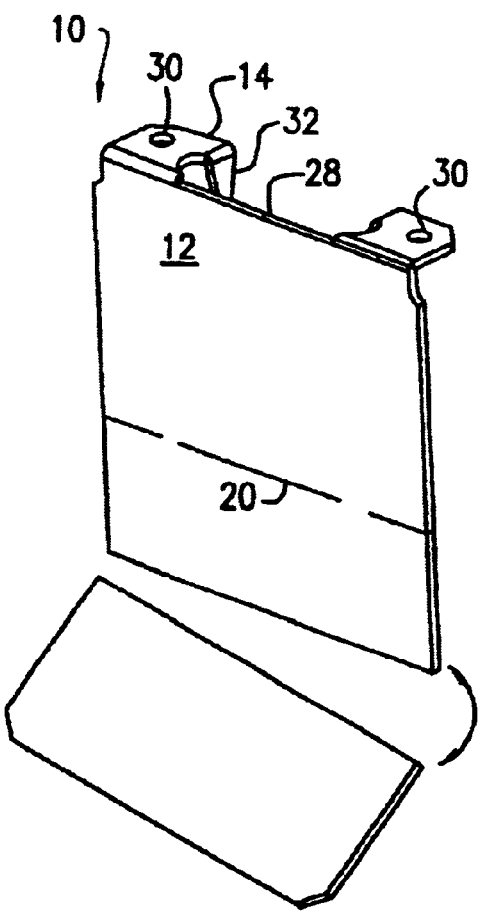
FIG. 8 is a front perspective view of the alternate embodiment shown in FIG. 7.

FIGS. 7 and 8 show an embodiment of protector plate 10 wherein there are multiple flanges 14 extending from end region 28 of front panel 12. The extending end region 34 of each flange 14 is configured with a prong 32 designed to engage its support member 18. In this embodiment, there are sawteeth along each prong 32 in order to better engage support member 18. As indicated earlier, while prongs 32 are shown as oriented perpendicular to the grain of furring strip 24, prongs 32 may also be manufactured or configured so that they are parallel to this grain. FIG. 8 shows protector plate 10 after a portion of front panel 12 has been removed along score line 20.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A protector plate for securement to a support member having front and side surfaces comprising:
   (a) a front plate having a surface designed for engagement against the front surface of the support member, said front plate having a first edge thereof;
   (b) a flange extending from said first edge and generally transverse to said front plate, one surface of said flange being designed for engagement against the side surface of the support member;
   (c) a prong extending from said flange in a direction generally parallel to said front plate, said prong having a terminal end for penetration into the side surface of the support member; and,
   (d) wherein the length of said front plate is greater than the extension of said flange.

2. The protector plate as set forth in claim 1 wherein said prong extends from said flange with the plane of said prong being perpendicular to the plane of said front plate.

3. The protector plate as set forth in claim 1 wherein said prong extends from said flange with the plane of said prong being neither parallel nor perpendicular to the plane of said front plate.

4. The protector plate as set forth in claim 1 wherein said front plate is generally rectangular having a side edge longer than said first edge.

5. The protector plate as set forth in claim 1 wherein said flange is integral to said front plate and bent therefrom.

6. The protector plate as set forth in claim 1 wherein said flange includes an opening therein for the insertion of a fastener therethrough.

7. The protector plate as set forth in claim 1 wherein said prong is spaced from said front plate.

8. The protector plate as set forth in claim 1 wherein said prong extends downwardly from said flange in the same direction as said front plate.

9. The protector plate as set forth in claim 1 wherein there are a plurality of said prongs.

10. The protector plate as set forth in claim 1 wherein said prong is at or near the terminal end of said flange.

11. The protector plate as set forth in claim 1 wherein said flange extends along the entire length of said first edge.

12. The protector plate as set forth in claim 1 wherein there are a plurality of flanges located along the length of said first edge.

13. The protector plate as set forth in claim 1 wherein the terminal end of said prong is beveled.

14. The protector plate as set forth in claim 1 wherein said prong is integral to said flange and bent therefrom.

15. The protector plate as set forth in claim 1 wherein said front plate is scored to ease separation and/or bending of a portion of said front plate.

16. The protector plate as set forth in claim 1 wherein said prong is configured with one or more sawteeth.

17. The protector plate as set forth in claim 1 wherein said prong consists of a series of adjacent sawteeth.

18. A protector plate for attachment to a support member having stronger and weaker axis comprising:
   (a) a protective panel (b) a smaller flange secured to and extending from said protective panel in a generally transverse direction,
   (c) penetration means attached to said smaller flange for securing the protector plate to the support member, said penetration means engaging said support member along its stronger axis, said penetration means includes a protruding or extending end of a prong.

19. A method of securing a protector plate to a support member having a front surface, side surface, and a corner, comprising the steps of:
   (a) providing a front plate having a surface designed for engagement against the front surface of the support member, said front plate having a first edge thereof;
   (b) providing a shorter flange extending from said first edge and generally transverse to said front plate, one surface of said flange being designed for engagement against the side surface of the support member;
   (c) providing a prong extending from said flange in a direction generally parallel to said front plate, said prong having a terminal end for penetration into the side surface of the support member;
   (d) positioning a corner and adjoining surface of the support member within a support member receiving area defined by said front plate and said flange which extend different distances from each other;
   (e) driving said prong which extends from said shorter flange into the support member.

* * * * *